United States Patent
Weikel

[19]

[11] Patent Number: 6,102,195
[45] Date of Patent: Aug. 15, 2000

[54] BELT CONVEYOR

[76] Inventor: Charles W. Weikel, 500 Fulton, Geneva, Ill. 60134

[21] Appl. No.: 09/277,316

[22] Filed: Mar. 26, 1999

[51] Int. Cl.[7] .................................................. B65G 39/16
[52] U.S. Cl. ..................... 198/808; 198/818; 198/860.1
[58] Field of Search ........................... 198/735.1, 735.3, 198/735.5, 808, 818, 860.1, 860.3, 860.4, 860.5

[56] References Cited

U.S. PATENT DOCUMENTS

| | | | |
|---|---|---|---|
| 2,109,925 | 3/1938 | Mitchell | 198/808 |
| 2,249,588 | 7/1941 | Waddle | 198/860.4 X |
| 3,069,786 | 12/1962 | Nichols, Jr. | 198/818 X |

FOREIGN PATENT DOCUMENTS

| | | | |
|---|---|---|---|
| 2167369 | 5/1986 | United Kingdom | 198/818 |

*Primary Examiner*—James R. Bidwell
*Attorney, Agent, or Firm*—Rockey, Milnamow & Katz, Ltd.

[57] ABSTRACT

An improved enclosed belt conveyor system for transferring material with a minimum of dust and energy consumption. An alignment device having an external adjustment mechanism to adjust dynamically balanced spools, which are mounted on a shaft is terminated in the alignment devices. The belts for the conveyed material are in an enclosed structure while the bearings and the bearing adjustment mechanisms are external of the enclosed structure, which encloses the spools and the belts thereby limiting the debris or dust to which bearings are subjected. The balanced flared spools have closed and sealed ends, thereby totally eliminating air turbulence, within the structure. Turbulence will accentuate dust movement within the enclosure. This invention permits the alignment of each individual roller while maintaining the cones of the spools and bearings in a dust free environment as possible. The spool cone is not subjected to a fan-like effect at the ends of the spool creating air turbulence and depositing material in the cone. The bearings if contained within the enclosed structure are subjected to any and all dust or debris which came from the material due to the turbulence in prior art of the fan-like effect of the spool. There is also a plug or release door in the tail with separately driven poodles for dislodging and removing accumulated material from the enclosure. There is no balanced spindle or spool with closed ends mounted to an exterior alignment device for the bearing similar to this invention. The special compartmentalized structure, including the trapezoidal shape roof or top, sheds water and permits easy access to the interior of the structure.

8 Claims, 2 Drawing Sheets

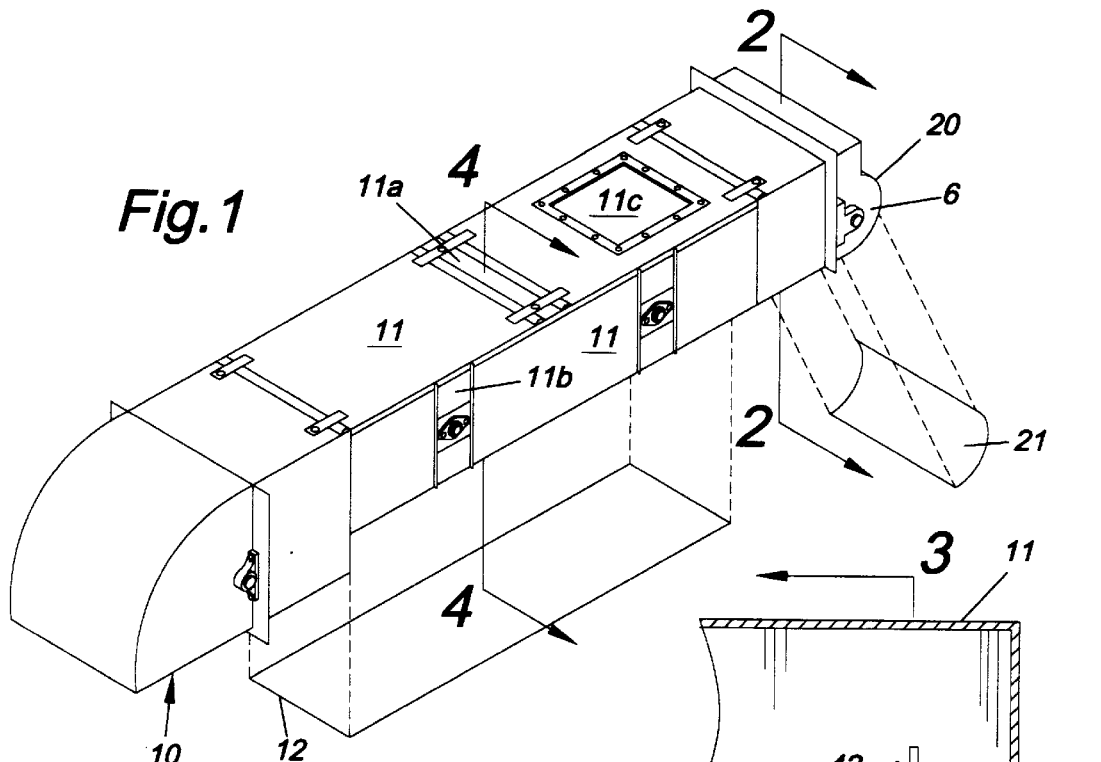
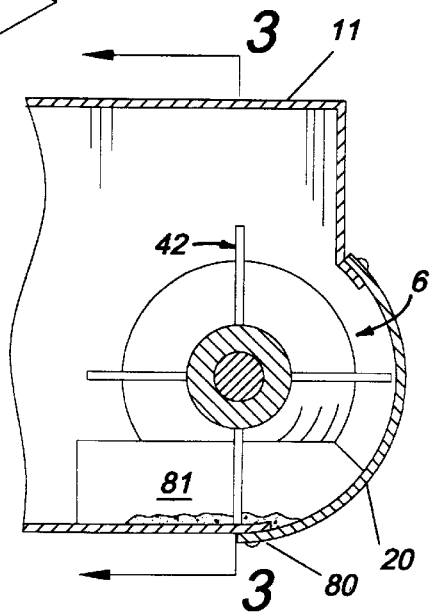
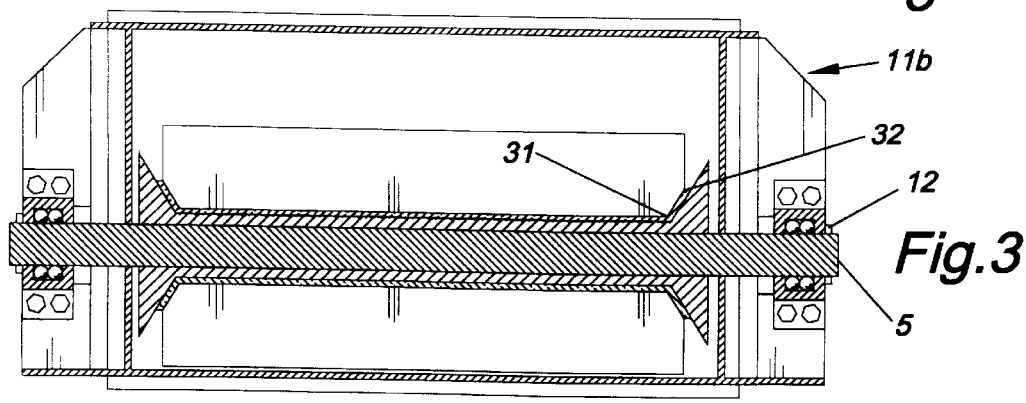

BELT CONVEYOR

BACKGROUND OF THE INVENTION

The movement of grain and other materials between various storage spaces, such as silos or bins to a plurality of vehicles or other methods for transporting the grain, such as barges or trucks requires a means of conveying material from the bin to the barge, from the truck to the barge or from the barge to the bins. This conveying mechanism may be a belt conveyor or it may use paddles depending on the nature of the materials being moved and the distance to be moved.

Much of the material, which is subject to being moved by this conveying equipment contains a certain amount of dust. This dust varies in amount, is related to the amount and type of material and is most prevalent when the material is disturbed, such as during transport. This dust quite often becomes airborne during the transport and/or the dumping from the transport into the bin, silo or barge. This dust in many instances may explode when it has not been controlled properly. Grain elevators particularly have exploded and fire may result in a conveyor which has an excessive amount of dust retained in the atmosphere. The reason for the explosion being the ignition of the dust accumulated in areas outside the mass of the material. If the dust is retained within the body of the stored material, explosions or fires do not normally happen.

For these reasons among others, it is important to reduce or contain the dust generated or released during the movement of the material. This dust results from disturbing of the stable mass by the movement of the grain or material in the conveyor, which movement releases the dust normally held in the mass. In an enclosed conveyor this dust also has gotten into the bearings of the conveyor. This resulted in increased wear on the bearings supporting the belts and generates heat which could ignite the dust. This wear also may require new bearings and at the very least will increase the power required to move the material.

Originally, most conveyors, including belt conveyors, were open to the atmosphere and did not contain the dust, therefore fires did not occur. Then the conveyors were enclosed and the dust released from the material was further agitated by the fan-like action of the support spokes for the ends of the rollers. Thus the rollers, which support the belts have caused problems once the conveyors were enclosed to prevent dust pollution of the atmosphere.

The dust within the enclosed conveyor became turbulent due to the movement of air caused by the fan-like spokes on the rollers. The rollers became unbalanced as the accumulation of grain dust inside the rollers and on surfaces inside the cone caused uneven wear and unbalanced forces, thus absorbing more energy. Any change in the alignment of the rollers or the rotation of the rollers results in the flow pattern of the belt being changed, thus also causing a reduction in the efficiency of the conveyor.

Once the entire conveyor was enclosed, in order to retain the dust, the bearings were inside the enclosure in the dust making it difficult to service, adjust or replace the bearings.

SUMMARY OF THE INVENTION

Prior art conveyors did not perform completely satisfactorily, because among other things, the design of the rollers. The poor balance, in fact the rollers were not balanced and the fan action of the spokes of the rollers to the airborne dust within the enclosure caused the rollers to accumulate dust internal to the rollers. This eccentric accumulation further unbalanced the rollers.

In accordance with this invention there is provided an enclosed belt conveyor having a minimum of air movement in the enclosure. The conveyor also has rollers that are balanced to reduce power requirements, provide smoother movement and improve tracking of the loaded belt on the supporting rollers. This balance is obtained by a novel fabrication process to balance statically during the weld of the cone ends to the center cylinder.

By the balancing of the rollers, sealing the ends of the rollers and by moving the bearings to a location outside the enclosed conveyor, bearing life has been improved. This location also provides easy adjustment by a novel mechanism and availability for servicing of the bearings. Belt adjustment is facilitated so that belt tracking across the rollers is maintained in the proper position.

In addition, by making the enclosure for the conveyor in sections provides for easy replacement or access to the interior of the sections. The cover of this enclosed conveyor is also sectionalized and made in a special trapezoidal shape, which also permits easy access and deflects water from reaching the grain on the conveyor.

For conveyors that are in a plugged condition or filled with excess material, a special door located near the reloading paddles in the conveyor tail section that allows for excess material to be pushed out the sides into the ingress automatically by the reloading paddles, thus clearing the conveyor.

DESCRIPTION OF THE DRAWINGS

FIG. 1 is an isometric view of the enclosed conveyor as assembled.

FIG. 2 is a side view of the self-cleaning section.

FIG. 3 is an end view of the conveyor showing the rollers, belts and bearings

DETAILED DESCRIPTION OF A PREFERRED EMBODIMENT OF THE INVENTION

Figure 4:
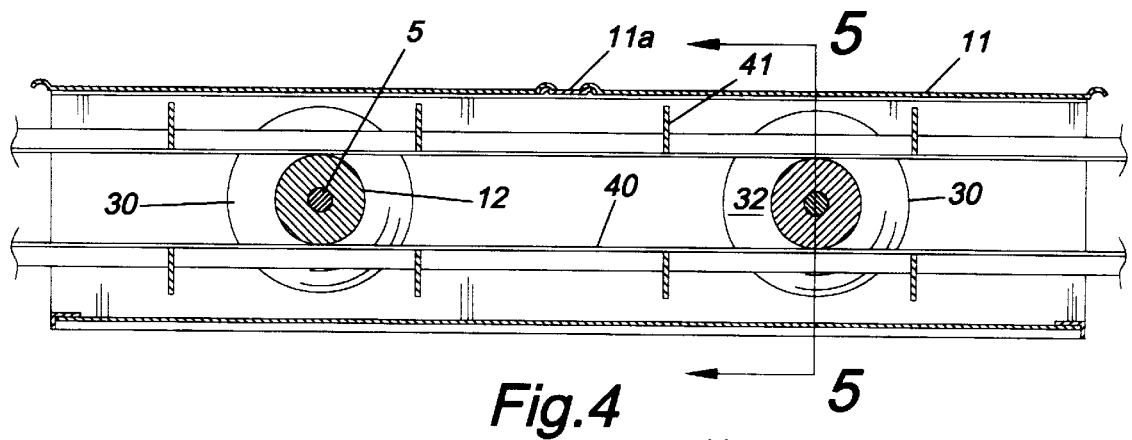
FIG. 4 is a side view of two rollers and the belt of the conveyor.

FIG. 1 shows the enclosed conveyor as assembled with the grain entering the conveyor at No. 21 and exiting out the exiting pipe 10. As shown in FIG. 3, there are a plurality of rollers 30 mounted on shafts 5 which are spaced along the various sections of the conveyor. The shafts 5 and the rollers 30 supported at various locations and support the belt 40. The belt 40 is moved or driven by a motor and mechanism not shown, which propels the belt 40 loaded with grain or other materials at one and to be conveyed in a constant rotation to the other end of the conveyor where it deposits the grain for exit and returns on the lower part of the spools to the entrance, to pick up another load.

One of the improvements of this invention is the reduction of air movement or turbulence in the space 34, between the ends of the spool or spindle 30 and the sides of the enclosure 11. By making the solid face 32 on the ends of all the spools, there is a minimum amount of air disturbed or moved to cause turbulence. This turbulence in the prior art caught much of the chaff from the grain carried and deposited it in the open-end portion of the spool in the prior art. By having no fan effect due to the arms normally supporting the ends i.e. circumference of the spools, the turbulence is reduced.

The ends being closed and sealed, there is no space to deposit the dust in the spools so the air movement is toward the exit because of the rotational movement of the spools and the belt toward the exit.

As shown in FIG. 2, there is a self-cleaning tail, which as in the prior art, consists of flaps or paddles 42 driven at the side of belt 40, which serves to pick up grain or materials 80 in the bottom of the self-cleaning tail at point of egress and returns it to the ingress.

In addition to having closed faces 32, preferably sealed on the exterior of the spools or spindles 30, each of the spindles 30 is statically balanced prior to being placed in the conveyor system. This balance includes the sealed flare section of the spool 30. The corner divergence point 31 between the straight portion of the spindle and the flared portion of the spindle must join the two parts, such that the spool is balanced throughout. This requires extremely accurate manufacturing including a compression of the roller ends during welding process, whereby the rollers offer true and consistent rotation with only minute alignment tolerances. This unique roller may also be manufactured from a single piece of metal or become a single piece after a proper welding process as long as balancing process is also applied.

Figure 5:
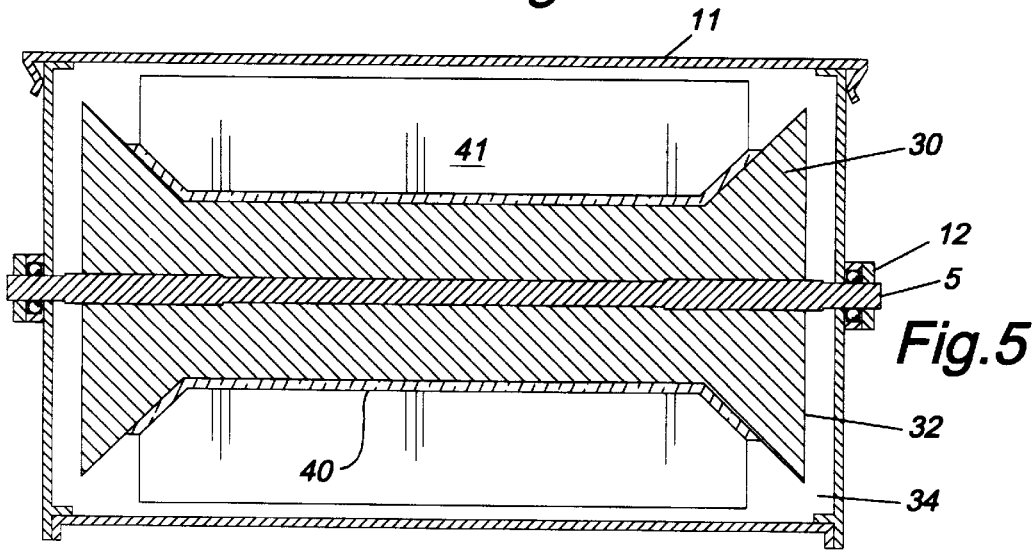
FIG. 5 is a cross-sectional view of the rollers, belt and conveyor assembly.
Figure 6:
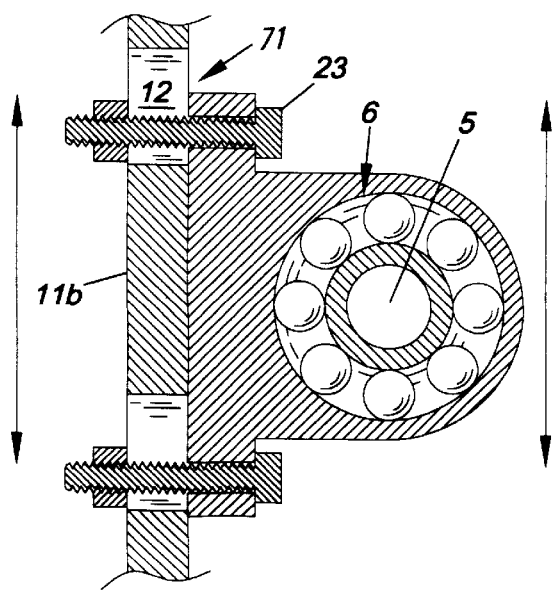
FIG. 6 is a detailed view of the bearing assembly, including the alignment mechanism.

FIG. 4 illustrates the compartmentalized, sectionalized nature of the enclosure 11. As shown in FIG. 4, the sections are removable at 11a by removing the holding mechanisms 11b as shown in FIG. 16a, so the top and bottom sections can be removed separately. This permits easy access to the belt 40 and the rollers 30. As shown in FIG. 5, the bearings 12 are placed exterior of frame 11. This means that the bearings 12 are not subjected to the dust or debris within the enclosure 11. The bearings 12 are maintained cleaner and also available for easy maintenance. This exterior bearing position or mounting also provides for the novel alignment device 71 of this invention. The novel alignment device 71 of this invention is shown in FIG. 6. The bearing 6 and the shaft 5 are held on the outside of enclosure 11 with screws 23. The enclosure 11 has a slot 72 so that the bearing may be adjusted anywhere in the slot by loosening the screw and adjusting the bearing and shaft to the proper position, then tightening the screws 23.

As shown in FIG. 3, there is an additional cover mechanism or strength mechanism 11b for holding the bearings securely. This member permits or limits the movement of the bearing along the path of the movement of the belt.

This novel alignment device for aligning the novel balanced spools 30 with closed ends 32 permits the operation of the conveyor belt 40 with the absolute minimum of vibration and power requirements. The rollers 40 can now be easily adjusted or aligned to permit this system to run true and free.

Variations and other aspects of the preferred embodiment will occur to those first in the art all without departure from the spirit and scope of the invention.

What is claimed is:

1. A continuous belt conveyor comprising:

a) a frame having a compartmentalized enclosed structure surrounding said frame including a first ingress and an egress for material being transported;

b) a plurality of rollers supported on a shaft for rotation in said structure;

c) a continuous belt supported on said rollers;

d) a source of power connected to said belt for driving said belt around said rollers;

e) each of said rollers being a spool having a cylindrical center section and an outwardly flared end sections, said belt cradled on said center section and a portion of said end sections;

f) said rollers being balanced;

g) said shaft mounted on bearings affixed to said compartmentalized structure whereby said belt traverses said spools between said ingress and said egress.

2. The invention in accordance with claim 1, wherein the ends of said rollers are closed thereby reducing air turbulence caused by rotation of said rollers in said structure.

3. The invention in accordance with claim 2, wherein said bearings are mounted to the exterior of said closed structure.

4. The invention in accordance with claim 2, wherein said bearing mountings include an adjustment mechanism.

5. The invention in accordance with claim 4, wherein the adjustment mechanism includes a slot in said enclosed structure and fastening members for locking said bearings at a location in said slot.

6. The invention in accordance with claim 1, wherein the top of said compartmentalized structure is a removable section having a special trapezoidal shape which permits easy access to structure and when fastened in place deflects water from reaching the material on the conveyor.

7. The invention in accordance with claim 1, wherein said enclosed structure includes flange frame members and removable sections between said flange frame members thereby improving the rigidity of said structure.

8. The invention in accordance with claim 2, wherein a second egress in said enclosed structure is adjacent to said ingress, including a plurality of driven paddles spatially removed from said belt engaging accumulated material and removing it through said second egress.

* * * * *